(12) United States Patent
Düll et al.

(10) Patent No.: US 10,107,205 B2
(45) Date of Patent: Oct. 23, 2018

(54) COMPUTER-AIDED CONTROL AND/OR REGULATION OF A TECHNICAL SYSTEM

(71) Applicant: SIEMENS AKTIENGESELLSCHAFT, München (DE)

(72) Inventors: Siegmund Düll, München (DE); Daniel Hein, München (DE); Alexander Hentschel, München (DE); Thomas Runkler, München (DE); Steffen Udluft, München (DE)

(73) Assignee: Siemens Aktiengesellschaft, München (DE)

( * ) Notice: Subject to any disclaimer, the term of this patent is extended or adjusted under 35 U.S.C. 154(b) by 170 days.

(21) Appl. No.: 15/023,480

(22) PCT Filed: Aug. 5, 2014

(86) PCT No.: PCT/EP2014/066810
§ 371 (c)(1),
(2) Date: Mar. 21, 2016

(87) PCT Pub. No.: WO2015/043806
PCT Pub. Date: Apr. 2, 2015

(65) Prior Publication Data
US 2016/0208711 A1 Jul. 21, 2016

(30) Foreign Application Priority Data
Sep. 25, 2013 (DE) .................. 10 2013 219 307

(51) Int. Cl.
*G05D 3/12* (2006.01)
*G05D 5/00* (2006.01)
(Continued)

(52) U.S. Cl.
CPC .............. *F02C 9/00* (2013.01); *G05B 13/027* (2013.01); *G05B 13/041* (2013.01); *G06N 3/006* (2013.01);
(Continued)

(58) Field of Classification Search
None
See application file for complete search history.

(56) References Cited

U.S. PATENT DOCUMENTS

2009/0271344 A1    10/2009   Schafer et al.
2010/0004770 A1    1/2010    Rameau et al.
(Continued)

FOREIGN PATENT DOCUMENTS

CN    101566829 A    10/2009
CN    101842754 A    9/2010
(Continued)

OTHER PUBLICATIONS

Korean Office Action for Korean Application No. 10-2016-7010531, dated Aug. 18, 2017.
(Continued)

*Primary Examiner* — Robert Cassity
(74) *Attorney, Agent, or Firm* — Lempia Summerfield Katz LLC

(57) ABSTRACT

The embodiments relate to a method for the computer-aided control and/or regulation of a technical system, particularly a power generation installation. The actions to be performed in the course of regulation or control are ascertained using a numerical optimization method (e.g., a particle swarm optimization). In this case, the numerical optimization method uses a predetermined simulation model that is used to predict states of the technical system and, on the basis (Continued)

thereof, to ascertain a measure of quality that reflects an optimization criterion for the operation of the technical system.

15 Claims, 2 Drawing Sheets

(51) Int. Cl.
  *F02C 9/00* (2006.01)
  *G05B 13/02* (2006.01)
  *G06N 3/00* (2006.01)
  *G06N 3/04* (2006.01)
  *G06N 99/00* (2010.01)
  *G05B 13/04* (2006.01)
  *G06N 3/08* (2006.01)

(52) U.S. Cl.
  CPC ........... *G06N 3/0445* (2013.01); *G06N 3/086* (2013.01); *G06N 99/005* (2013.01)

(56) References Cited

U.S. PATENT DOCUMENTS

| | | | |
|---|---|---|---|
| 2010/0241243 A1 | 9/2010 | Hans et al. | |
| 2010/0257866 A1* | 10/2010 | Schneegass | G05B 13/027 60/773 |
| 2011/0257800 A1* | 10/2011 | Al-Hamouz | G05B 13/024 700/287 |
| 2011/0307438 A1 | 12/2011 | Fernández Martínez | |
| 2012/0010757 A1* | 1/2012 | Francino | G05B 15/02 700/291 |
| 2013/0013543 A1* | 1/2013 | Dull | G05B 13/027 706/25 |

FOREIGN PATENT DOCUMENTS

| | | |
|---|---|---|
| CN | 102331758 A | 1/2012 |
| CN | 102792234 A | 11/2012 |
| DE | 102007001025 A1 | 7/2008 |
| DE | 102007042440 B3 | 1/2009 |
| DE | 102008020379 A1 | 10/2009 |
| DE | 102010011221 A1 | 9/2011 |
| DE | 102011079433 A1 | 1/2013 |
| KR | 20100004893 A | 1/2010 |
| WO | WO2010004587 A2 | 1/2010 |

OTHER PUBLICATIONS

Rini, Dian Palupi, Siti Mariyam Shamsuddin, and Siti Sophiyati Yuhaniz. "Particle swarm optimization: technique, system and challenges." International Journal of Computer Applications 14.1 (2011): 19-26.

Shi, Yuhui, and Russell Eberhart. "A modified particle swarm optimizer." Evolutionary Computation Proceedings, 1998. IEEE World Congress on Computational Intelligence., The 1998 IEEE International Conference on. IEEE, 1998.

PCT International Search Report for corresponding PCT/EP2014/066810, dated Aug. 5, 2014, with English Translation.

German Office Action for German Application No. 10 2013 219 307.6, dated Apr. 25, 2014, with English Translation.

Chinese Office Action for Chinese Patent Application No. 201480053081 dated Jun. 2, 2017, with English Translation.

\* cited by examiner

COMPUTER-AIDED CONTROL AND/OR REGULATION OF A TECHNICAL SYSTEM

The present patent document is a § 371 nationalization of PCT Application Serial Number PCT/EP2014/066810, filed Aug. 5, 2014, designating the United States, which is hereby incorporated by reference, and this patent document also claims the benefit of DE 10 2013 219 307.6, filed on Sep. 25, 2013, which is also hereby incorporated by reference.

TECHNICAL FIELD

The embodiments relate to a method for controlling and/or regulating a technical system, (e.g., an energy generation installation), in a computer-assisted manner.

BACKGROUND

When controlling and/or regulating technical systems, it may be desirable to influence the operation of the technical system by carrying out corresponding actions in such a manner that the behavior of the technical system is optimized with respect to particular criteria. For example, when operating a gas turbine, it is useful to reduce the exhaust gas emissions produced by the turbine and to keep the combustion dynamics of the combustion chamber of the gas turbine (also referred to as combustion chamber humming) as low as possible. In this case, it is possible to influence, for example, parameters relating to the supply of gas and air to the combustion chamber of the gas turbine.

Computer-assisted methods used to determine an action selection rule are disclosed, according to which actions are determined for corresponding successive states of the technical system characterized by suitable state variables of the system, which actions are optimal with respect to an optimization criterion, for example the above-mentioned low pollutant emission and low combustion chamber humming. DE 10 2007 001 025 A1 and DE 10 2008 020 379 A1 describe the determination of an action selection rule on the basis of the training of a recurrent neural network with training data including known states and actions. According to the action selection rule, an action sequence is output for a current state of the technical system taking into account past states on the basis of an optimization criterion.

The known methods for determining an action selection rule using recurrent neural networks have the disadvantage that the optimization criterion in the form of a measure of quality is concomitantly included when training the recurrent neural network. Consequently, it is not possible to readily react to a changing optimization criterion during real operation of the technical system since the neural network may have to be completely retrained for this purpose.

SUMMARY AND DESCRIPTION

The scope of the present invention is defined solely by the appended claims and is not affected to any degree by the statements within this summary. The present embodiments may obviate one or more of the drawbacks or limitations in the related art.

The object of the embodiments is therefore to provide a method for controlling and/or regulating a technical system in a computer-assisted manner, which method easily determines actions to be carried out on the technical system according to an optimization criterion.

The method is used to control and/or regulate a technical system in a computer-assisted manner. The technical system is, in particular, an energy generation installation and, in one particularly embodiment, a gas turbine, as described in more detail further below. If appropriate, however, the technical system may also be an energy generation installation in the form of a regenerative energy generation installation, for example a wind turbine. The dynamic behavior of the technical system is respectively characterized in the method for a plurality of times by a state of the technical system and an action carried out on the technical system in this state, a respective action at a respective time resulting in a new state of the technical system at the next time. In this case, an action sequence is one or more actions to be successively carried out on the technical system in a temporal sequence. A state of the technical system includes one and more state variables that are operating states of the technical system or variables that influence the operation of the technical system. In contrast, actions are the change of one or more action variables, the action variables possibly also being able to be state variables that may be changed when regulating and/or controlling the technical system.

In the method, a measure of quality with respect to an optimization criterion for operating the technical system may be calculated for each action sequence on the basis of the states of the technical system that result from carrying out the actions in the action sequence, the measure of quality being higher, the better the optimization criterion is satisfied. In this case, the term "optimization criterion" may be broadly understood, and this criterion may possibly include a plurality of partial criteria or sub-criteria.

According to act or feature a) of the method, a simulation model of the technical system is provided and may be used to predict the resulting states of the technical system for respective action sequences. Such simulation models are known per se from the prior art. The simulation model may be, for example, a data-driven model which is based on previously determined data relating to the operation of the technical system or is trained using said data. The simulation model may likewise be an analytical model and/or a physical model of the technical system.

In one particularly embodiment, a data-driven model in the form of a neural network, in particular a recurrent neural network, is used as the simulation model. In this case, the neural network is trained on the basis of training data from known action sequences having known resulting states of the technical system. In one special embodiment, the neural network described in DE 10 2010 011 221 A1 for modeling the dynamic behavior of a technical system is used within the scope of the method. Instead of a neural network, the data-driven model may possibly also be based on Gaussian processes and/or regression trees and/or support vector regression.

In act b) of the method, an action sequence having the highest possible measure of quality is determined at a respective predefined time from a sequence of successive predefined times using a numerical optimization method, the optimization method using the provided simulation model to predict the resulting states of the technical system for action sequences generated during the numerical optimization method and to then determine the measure of quality of the generated action sequences using these predicted states. The term "the generated action sequences" includes all action sequences processed or generated during the numerical optimization method and not only the action sequence determined and ultimately output by the numerical optimization method. In contrast to other methods, a numerical optimization method does not require any training act carried out in advance.

In one particularly embodiment, a non-convex heuristic optimization method and/or a gradient-free stochastic search method is/are used as the numerical optimization method. The numerical optimization method may be a particle swarm optimization and/or an evolutionary algorithm and/or a genetic algorithm and/or simulated annealing. All of these methods are known per se from the prior art and are therefore not described in any more detail.

In act c) of the method, at least some of the actions in the action sequence determined in act b) are carried out on the technical system. In other words, the first action and possibly also further subsequent actions in the determined action sequence are carried out. In particular, only the first action may be carried out in act c), in which case act b) is then immediately repeated in order to determine a new action to be carried out. This results in the actions satisfying the optimization criterion used very well.

The method is distinguished by the fact that neither the simulation model used nor the numerical optimization method requires the measure of quality in advance during a training process, as is the case, for example, when training an action selection rule by a neural network. Consequently, the method may be quickly configured to changing conditions during operation of the technical system by suitably changing the measure of quality or its calculation. In this case, a user interface may be provided when regulating and/or controlling the technical system and may be used by a user to change the measure of quality. The user may therefore vary the measure of quality online during operation of the technical system. The operation of the technical system need not be interrupted for this purpose. A user may use the user interface to adjust the focal points desired by him with regard to the optimality of the operation of the technical system by varying the measure of quality. In the case of a technical system in the form of a gas turbine, the user may carry out a weighting between the reduction in the lifetime of the turbine and efficiency, for example. In emergency situations, it may be useful to operate the turbines with an increased reduction in the lifetime since the power may be sold at a significantly more expensive price and compensates for the increased wear and tear.

In another embodiment, the numerical optimization method is particle swarm optimization, the particles of which are assigned to respective action sequences randomly determined when initializing the particle swarm optimization and are iteratively changed during the particle swarm optimization by respective speed vectors, the respective speed vectors being determined using a fitness function that corresponds to the measure of quality. The particle swarm optimization may therefore be implemented in a simple manner in the method by virtue of the fitness function used in the process being equated with the measure of quality.

In a further variant, during the particle swarm optimization when calculating the speed vector for a respective particle, a number of neighboring particles according to a predefined topology are used. The topology specifies edges between the particles that correspond to nodes in this sense. In this case, all particles (e.g., directly) connected to a respective particle via an edge are neighboring particles of the respective particle. Better solutions may be found by the particle swarm optimization by taking into account neighboring particles on the basis of a predefined topology.

In one special variant, a ring topology, in which the particles are connected via edges in such a manner that the particles form a ring with the edges, is used as the predefined topology. Consequently, each particle has at least two neighboring particles on the ring. One or more further edges may optionally be provided for a respective particle, which edges connect the respective particle to further particles not (directly) connected to the respective particle via an edge of the ring.

In another embodiment, the particle swarm optimization is configured in such a manner that a maximum value and a minimum value of the speed components of the speed vector are predefined, in which case, if a speed component exceeds the maximum value, this speed component is set to the maximum value and, if a speed component undershoots the minimum value, this speed component is set to the minimum value. In this case, the minimum value may be the negative value of a positive maximum value. This variant of the particle swarm optimization is explained in yet more detail in the detailed description.

In another modification of the particle swarm optimization, a respective speed vector is determined in an iteration act using the respective speed vector of the preceding iteration act multiplied by a weighting factor. This modification of the particle swarm optimization is also explained in yet more detail in the detailed description.

In another embodiment of the method, the measure of quality is a (e.g., discounted) sum, the summands of which each include an assessment measure determined for each state resulting from an action in the action sequence, the assessment measure in the respective summand may be multiplied by a factor that is smaller, the further the state, for which the assessment measure is determined, is in the future. In this manner, states that are further in the future are taken into account to an increasingly lesser degree when determining the measure of quality.

In one variant, the method is used to regulate and/or control an electrical energy generation installation including a gas turbine. In this case, a state of the gas turbine may include one or more of the following state variables, an action relating, in particular, to a change of one or more of the following state variables: the compressor efficiency of the gas turbine; the turbine efficiency of the gas turbine; the regulated exhaust gas temperature of the gas turbine; the position of one or more guide blades, in particular in the compressor of the gas turbine; the rotational speed of the gas turbine; one or more pressures and/or temperatures in the gas turbine, in particular the inlet temperature and/or the inlet pressure and/or the outlet temperature and/or the outlet pressure in the compressor and/or in the turbine; the temperature in the environment in which the gas turbine is operated; the humidity in the environment in which the gas turbine is operated; the air pressure in the environment in which the gas turbine is operated; one or more mass and/or volumetric flows; one or more parameters of a cooling and/or auxiliary system and/or lubricating oil and/or bearing systems in the gas turbine, in particular the position of one or more valves for supplying cooling air; the performance of the gas turbine, in particular a percentage performance value; the fuel quality of the gas turbine; the pollutant emission of the gas turbine, in particular the emission of nitrogen oxides and/or carbon monoxide; the temperature of one or more turbine blades of the gas turbine; the combustion dynamics of the combustion chamber of the gas turbine; one or more parameters relating to the supply of gas to the combustion chamber of the gas turbine; the amount of gas supplied to the gas turbine; or bearing and/or housing vibrations in the gas turbine.

In the case of a gas turbine, the lowest possible pollutant emission of the gas turbine and/or the lowest possible dynamics of the combustion chamber of the gas turbine, in particular, is/are suitable as the optimization criterion for operating the technical system.

In addition to the method described above, the embodiments also relate to an apparatus for controlling and/or regulating a technical system, in particular an electrical energy generation installation, in a computer-assisted manner. The apparatus includes a computer unit that may be used to carry out the method or one or more variants of the method.

A technical system is also provided, in particular an energy generation installation and, for example, a gas turbine, which includes the apparatus just described.

In addition, a computer program product is provided. The computer program product includes a program code that is stored on a machine-readable carrier and is intended to carry out the control and/or regulating method when the program code is executed on a computer.

BRIEF DESCRIPTION OF THE DRAWINGS

One exemplary embodiment is described in detail below using the accompanying figures, in which.

DETAILED DESCRIPTION

The method is described below using the example of a technical system in the form of a gas turbine. In this case, the aim of the method is to determine, in a corresponding state of the gas turbine, a sequence of optimal actions to be carried out in this state and in successor states, at least the first action in the sequence actually being carried out. In this case, a state is a vector including a multiplicity of state variables and may include the variables explained above. An action includes a number of action variables in the form of the change of one or more state variables that may be adjusted in the gas turbine. In the method, parameters relating to the supply of gas to the combustion chamber of the gas turbine, for example, have proved to be practical as state variables. In this case, corresponding actions relate to the changes of these parameters. The parameters include, in particular, corresponding fuel proportions that are injected into the combustion chamber of the gas turbine at different positions. These proportions may accordingly be changed, thus generating actions. In this variant, optimal actions are those actions that result in low humming in the combustion chamber in the long term. If appropriate, the actions may also be determined with regard to other or further optimization criteria, for example lowest possible emissions of pollutants.

Figure 1:
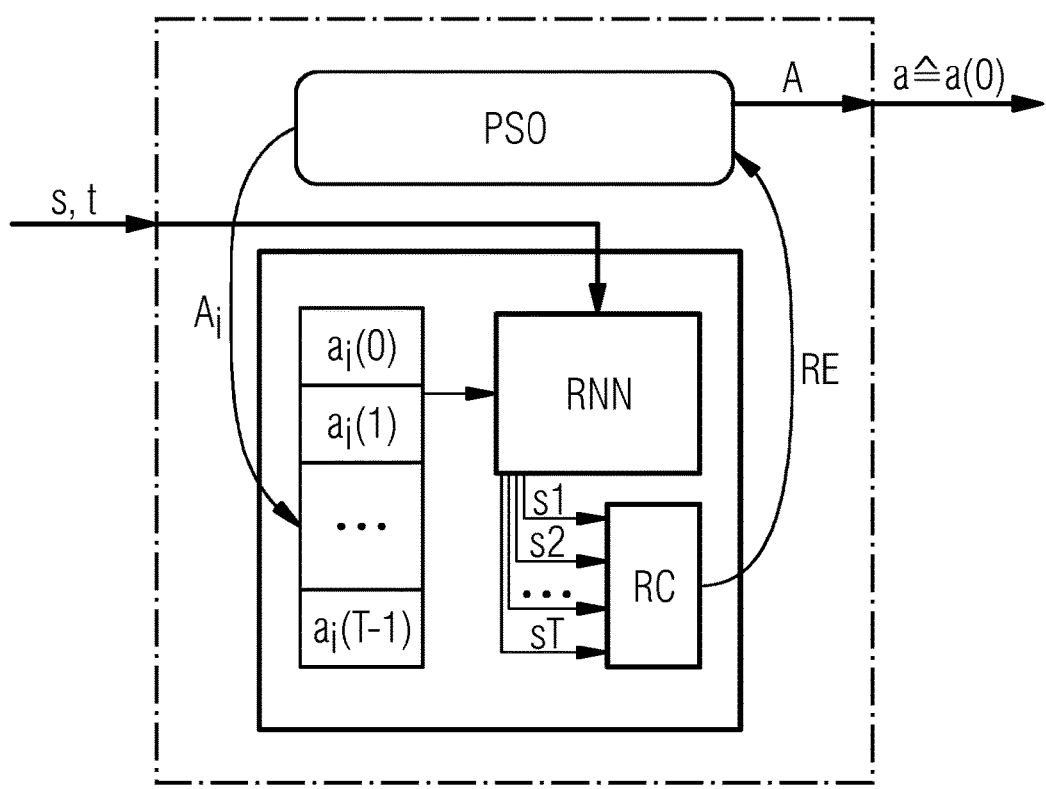
FIG. 1 depicts a schematic illustration of the sequence of one embodiment of the method.

In the embodiment explained here, an optimal action a that is then carried out on the technical system is determined according to FIG. 1 on the basis of a state s of the technical system at a current time t, possibly taking into account further past states at past times. A non-convex heuristic optimization method in the form of particle swarm optimization, which is designated PSO in FIG. 1, is used to determine the action a. In this case, the particle swarm optimization is a method known per se and the precise performance of the method in the embodiment in FIG. 1 is explained in more detail further below.

A recurrent neural network, which is designated RNN in FIG. 1, is also used to determine the action a. In this case, it is possible to use recurrent neural networks that are known per se from the prior art, for example the neural network (so-called MPEN network) described in DE 10 2010 011 221 A1. The neural network RNN is an embodiment of a simulation model in the sense of claim 1 and is used to predict the resulting successor states for a respective action sequence that specifies a plurality of actions to be successively carried out on the technical system. The method in FIG. 1 also includes the calculation of a measure of quality RE, which is indicated by the act RC (RC=reward calculator) in FIG. 1.

According to the embodiment in FIG. 1, the particle swarm optimization PSO uses the recurrent neural network RNN to predict states for an action sequence processed in the particle swarm optimization. The measure of quality RE is then calculated for the predicted states. As is described in more detail further below, the particle swarm optimization processes a multiplicity of particles that are specified with the index i according to FIG. 1. In this case, each particle is assigned an action sequence $A_i$ that includes the actions $a_i(0), a_i(1), \ldots, a_i(T-1)$ to be successively carried out starting from the state s at the current time. In other words, an event horizon of T time steps in the future starting from the current time is considered. The particle swarm optimization takes place iteratively, in which case a corresponding action sequence $A_i$ is obtained for each particle in each iteration act. The individual action sequences are randomly initialized at the start of the particle swarm optimization.

The action sequence for each particle is included, in the form of corresponding input nodes, in the recurrent neural network RNN, which then determines the successor states $s1, s2, \ldots, sT$ in the form of nodes of an output layer, which result from the actions $a_i(0), a_i(1), \ldots$ etc. that have been carried out, using a suitable concealed layer. The state s1 is the state of the technical system after applying the action $a_i(0)$ to the state s, the state s2 is the state of the technical system after applying the action $a_i(1)$ to the state s1 etc. Finally, the state sT corresponds to the state of the technical system that results from applying the action $a_i(T-1)$ to the state s(T-1).

The particle swarm optimization optimizes the action sequences $A_i$ for the individual particles. Each action sequence constitutes an $n_x = I \times T$ dimensional vector. T corresponds to the event horizon already mentioned above and I is the number of action variables for a respective action $a_i(0), a_i(2), \ldots, a_i(T-1)$. The search space of the particle swarm optimization is therefore a subspace of $\mathbb{R}^{I \times T}$ ($\mathbb{R}$ = space of the real numbers). The aim of the particle swarm optimization is to find an action sequence with the greatest measure of quality RE, this measure of quality being used as the fitness function $f$ of the particle swarm optimization. The fitness $f(s, A_i)$ for the particle i with the assigned action sequence $A_i$ is given as follows:

$$f: S \times \mathbb{R}^{I \times T} \to \mathbb{R}, \qquad (1)$$

$$f(s, A_i) \equiv RE = \sum_{k=1}^{T} \gamma^{k-1} r(sk)$$

S denotes the space of all states that may be assumed by the technical system. The variable $r(sk)$ is a suitably defined assessment measure (also referred to as reward) for a respective state sk predicted using the neural network, and the discounted weighted sum of all assessment measures of the action sequence $A_i$ is the measure of quality RE. The discount factor $\gamma$ becomes increasingly smaller with greater distance from the current time t, with the result that assessment measures that are further in the future are included in the measure of quality with a lower weight. The assessment measure is stipulated according to the desired optimization criterion for operating the technical system. Specifications of corresponding assessment measures are sufficiently well known to a person skilled in the art or are within the scope of the practice of a person skilled in the art.

In one embodiment, a factor γ dependent on the event horizon T is used in equation (1) above and is defined as follows:

$$\gamma = q^{1/(T-1)}, T > 1 \qquad (2)$$

In this case, q is a fixed value, where $0 < q \le 1$. As a result, the assessment measure r(s1), that is to say the assessment measure for the first action, is fully included in the measure of quality RE, whereas the assessment measure for the state r(sT) furthest in the future is discounted with the factor q. In one example, the value for q=5%=0.05.

During the particle swarm optimization, an action sequence $A_i$ is iteratively determined for each particle i on the basis of a predefined number of iteration acts, which are specified further below using the index m, using iteratively updated speed vectors, for which action sequence the measure of quality RE is then determined using the recurrent neural network RNN and the calculation RC, which measure of quality is included as the fitness in the particle swarm optimization and results in the calculation of the speed vector and therefore the action sequence for the respective particles for the next iteration act. After all iterations have been run through, the particle swarm optimization outputs an optimal action sequence designated A in FIG. 1. In the embodiment described here, the first action a=a(0) in this optimal action sequence A is carried out on the technical system. This results in a new state s at the new current time t in the technical system. This state is then again processed on the basis of the method in FIG. 1 in order to thereby determine the next action carried out on the technical system.

The method in FIG. 1 may output a suitable action to be carried out in a short computing time of 5 seconds or less. In this case, simulations carried out have shown that the calculated actions result in high measures of quality and therefore in good satisfaction of the optimization criterion specified using the measure of quality. In this case, it is advantageous that the measure of quality or its calculation may be easily changed. In one embodiment, a user interface may also be provided on the technical system when using the method in FIG. 1 and may be used by a user online to accordingly adapt the measure of quality if operating conditions of the technical system are changed.

Variants of the particle swarm optimization PSO used in FIG. 1 are described below. The particle swarm optimization algorithm may be population-based, non-convex, stochastic optimization heuristics. In this case, a multiplicity of particles in a particle swarm is considered, where a respective particle represents a possible solution to the problem under consideration. In the embodiment described here, each particle is assigned a potential solution in the form of an optimal action sequence $A_i$ to be determined. The particles iteratively fly through a multidimensional search space, also referred to as a fitness landscape. After each movement, each particle receives a fitness value for its new position, which fitness value is compared with its previous best fitness value. The fitness value used in the particle swarm optimization has already been defined above. In this case, the position of a particle corresponds to the action sequence $A_i$ determined in the corresponding iteration act.

The position (and therefore the action sequence) having the best fitness ever found by a particle in its neighborhood is output as the result of the particle swarm optimization. In this case, the neighborhood is stipulated in a suitable manner using a topology and specifies corresponding neighboring particles for a respective particle. The position at which a particle receives the highest fitness value is referred to as the particle's (own) best position. In contrast, the position at which any desired particle in the neighborhood of a respective particle, including the respective particle itself, receives the highest fitness value is referred to as the best neighborhood position.

Each particle is uniquely identified by an index i that runs from i=1 to i=N for a swarm of N particles. In this case, $x_i(m)$ denotes the position of the particle i and therefore the corresponding action sequence $A_i$ for the iteration act m, a predetermined number of iteration acts being carried out in the particle swarm optimization. A respective particle's own best position is calculated in the algorithm for the iteration act m as follows:

$$y_i(m) = \begin{cases} y_i(m-1), & \text{if } f(x_i(m)) \le f(y_i(m-1)) \\ x_i(m), & \text{if } f(x_i(m)) > f(y_i(m-1)) \end{cases} \qquad (3)$$

In this case, $f: \mathbb{R}^{n_x} \to \mathbb{R}$ is the fitness function already defined above for the $n_x$-dimensional search space, the state s of the technical system at the current time being predefined. The variable $y_i(m)$ corresponds to an action sequence $A_i$ from FIG. 1. When starting the particle swarm optimization, the position of each particle is randomly stipulated and is also its own best position at the same time.

Figure 2:
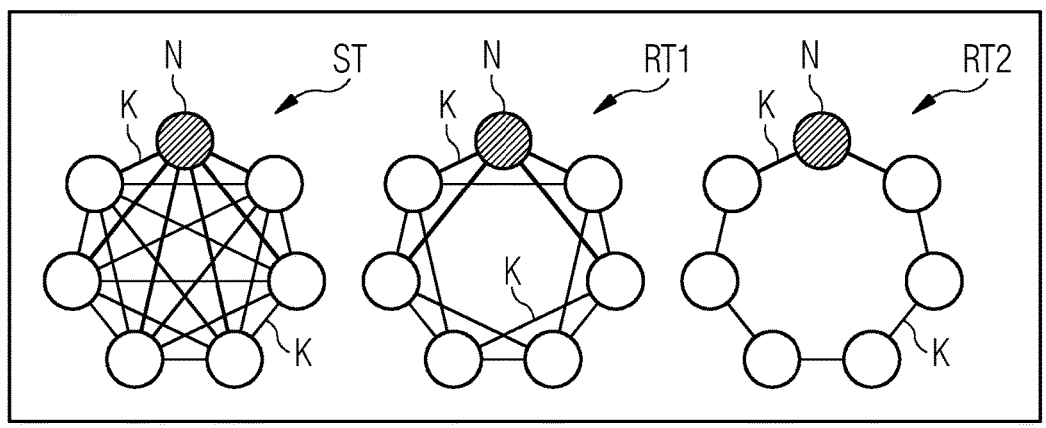
FIG. 2 depicts different variants of topologies that may be used in the particle swarm optimization in FIG. 1.

According to the above-mentioned topology of a neighborhood, the particles constitute nodes connected to one another via edges, the neighborhood of a respective particle including the particle itself and all other particles directly connected to the respective particle via an edge. In this case, the topology may be defined in different ways. FIG. 2 depicts different variants of topologies that may be used in the particle swarm optimization using the example of a particle swarm having 7 particles. A star topology ST and two variants of a ring topology RT1 and RT2 are shown in this case. The individual particles correspond in this case to respective nodes indicated as a circle, the neighborhood of the Nth particle being highlighted, for example. The nodes are connected to one another via edges K, only two edges being denoted with the reference symbol K in each topology for reasons of clarity. All nodes directly connected to a corresponding particle via an edge K are neighboring particles of the corresponding particle. According to the star topology, each particle is connected to every other particle, whereas, in the ring topology RT1, a respective particle has four neighboring particles and, in the ring topology RT2, a respective particle has only two neighboring particles. If appropriate, more complicated topologies may also be used in the particle swarm optimization according to FIG. 1.

The neighborhood of the particle i is defined according to the above description as:

$N_i = \{i\} \cup \{k \mid \text{particles i and particles k are connected via an edge of the topology}\}$.

During the particle swarm optimization, the particles communicate their own best positions to all particles in their neighborhood. Each particle determines the best neighborhood position therefrom as follows:

$$\hat{y}_i(m+1) = \underset{x \in \{y_j(m) | j \in N_i\}}{\operatorname{argmax}} f(x) \quad (4)$$

The particles then determine their position update on the basis of the speed described further below and move according to this position update. The speed for the next iteration act is then determined as a stochastic compromise between the respective particle's (own) best position and the best neighborhood position.

The position for each iteration act is changed by adding a speed vector $v_i(m)$ to the position of the respective particle, to be precise on the basis of the following equation:

$$x_i(m+1) = x_i(m) + v'_i(m+1), \text{ where}$$

$$v_{ij}(m+1) = wv'_{ij}(m) + c_1 r_{1j}(m)[y_{ij}(m) - x_{ij}(m)] + c_2 r_{2j}(m)[\hat{y}_{ij}(m) - x_{ij}(m)] \quad (5)$$

In this case, the method is initialized with respective particle positions $x_i(0)$ that are evenly distributed between previously stipulated limits $x_{min}$ and $x_{max}$, that is to say $x_i(0) \sim U(x_{min}, x_{max})$.

The speed vector $v_i(m)$ contains both a cognitive component and a social component and drives the optimization process of the algorithm. In this case, $v_{ij}(m)$ is the speed of the particle i in the dimension $j=1, \ldots, n_x$ for the iteration act m, in which case j represents the index of the action variables across all actions in the action sequence (and therefore of the event horizon T). The variable $x_{ij}(m)$ is the position of the particle i in the dimension j for the iteration act m and therefore corresponds to the value of an action variable of the action sequence. The variables $c_1$ and $c_2$ are positive acceleration constants used to scale the contribution of the cognitive and social components. For example, it is possible to use $c_1 = c_2 = 1.49618$. The variables $r_{1j}(m)$, $r_{2j}(m)$ $\sim U(0,1)$ are random values in the range [0,1] that are taken from an even distribution in order to introduce a stochastic element into the algorithm.

The constant factor w from equation (5) is an inertia weight (see Y. Shi, R. Eberhart, "A Modified Particle Swarm Optimizer," Proceedings of the IEEE Congress on Evolutionary Computation, pages 66 to 73, May 1998). This inertia weight w controls how much memory of the speed of the preceding iteration is intended to influence the new speed. The factor w may be assigned a fixed value from the range [0,1]. In one variant, w=0.7298 is selected. Particle swarm optimization with w=1 may also be interpreted as particle swarm optimization without an inertia weight.

"Velocity clamping" is also used (see D. P. Rini, S. M. Shamsuddin, S. S. Yuhaniz, "Particle Swarm Optimization: Technique, System and Challenges," International Journal of Computer Applications (0975-8887), Volume 14, No. 1, January 2011). In this case, the speed is cropped to a specific maximum value $V_{max,j}$ in the dimension j. In other words, the speed of the particle i is adapted as follows:

$$v'_{ij}(m+1) = \begin{cases} V_{max,j} & \text{if } v_{ij}(m+1) > V_{max,j} \\ v_{ij}(m+1) & \text{if } -V_{max,j} \le v_{ij}(m+1) \le V_{max,j} \\ -V_{max,j} & \text{if } v_{ij}(m+1) < -V_{max,j} \end{cases} \quad (6)$$

The maximum value $V_{max,j}$ may be stipulated in such a manner that it is 10% of the available total range of the positional fluctuation of the corresponding dimension j, that is to say:

$$V_{max,j} = \{x_{max,j} - x_{min,j}\}/10 \quad (7)$$

The particle swarm optimization may possibly also be carried out without velocity clamping. In this case:

$$v'_{ij}(m) = v_{ij}(m) \quad (8)$$

For the particle swarm optimization algorithm, a predetermined number of iterations is predefined in the embodiment described here. If this number is reached, that best neighborhood position with the greatest fitness from the best neighborhood positions of all particles is output as the result. This corresponds to the action sequence A according to FIG. 1.

The above embodiment of the method was tested using the regulation of a gas turbine. In this case, the particle swarm optimization described above was used with the two modifications. Two manipulated variables of the gas turbine were changed using corresponding actions. The measure of quality was defined with regard to low combustion chamber humming and low pollutant emissions of the turbine. 30 acts in the future were considered as the event horizon of the action sequences. 20 iteration acts and a swarm size of 50 particles were considered, inter alia, for the particle swarm optimization. In addition, the neighborhood was stipulated on the basis of a ring topology having four neighbors. The neural network described in DE 10 2010 011 221 A1 for modeling the dynamic behavior of a technical system was used as the recurrent neural network. When testing the method, it was possible to prove that the regulation or control determines actions with high measures of quality and in an appropriate computing time very well.

The embodiments of the method described above have a number of advantages. In particular, a technical system may be regulated or controlled with regard to any desired optimization criterion in an appropriate computing time using the computer-assisted method. In this case, the optimization criterion may be easily adapted by changing the measure of quality defined for this purpose since the measure of quality is not already previously used as part of a training process, as is the case, for example, when training an action selection rule on the basis of a neural network. Consequently, the measure of quality may be varied without any problems during real operation of the technical system.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for controlling, regulating, or controlling and regulating a technical system in a computer-assisted manner, in which dynamic behavior of the technical system is respectively characterized for a plurality of times by a state of the technical system and an action carried out on the technical system in the state, a respective action at a respective time resulting in a new state of the technical system at a next time, and an action sequence being one or more actions to be successively carried out on the technical system in a temporal sequence, a measure of quality with respect to an optimization criterion for operating the technical system being able to be calculated for each action sequence based on the states of the technical system resulting from carrying out the one or more actions in the action sequence, the measure of quality being higher, the better the optimization criterion is satisfied, the method comprising:

providing a simulation model of the technical system for predicting the resulting states of the technical system for respective action sequences;

determining an action sequence having a highest possible measure of quality at a respective predefined time from a sequence of successive predefined times using a numerical optimization method, the numerical optimization method using the simulation model to predict the resulting states for action sequences generated during the numerical optimization method and to then determine the measure of quality of the generated action sequences using the predicted states; and carrying out one or more actions in the determined action sequence on the technical system, the carrying out comprising changing one or more state variables of the technical system; and operating the technical system based on the one or more changed state variables of the technical system, wherein the numerical optimization method comprises a particle swarm optimization, the particles of which are assigned to respective action sequences randomly determined when initializing the particle swarm optimization and are iteratively changed during the particle swarm optimization by respective speed vectors, the respective speed vectors being determined using a fitness function corresponding to the measure of quality, and wherein the technical system is an electrical energy generation installation.

2. The method of claim 1, wherein the carrying out one or more actions comprises (1) carrying out only the first action in the determined action sequence according to the temporal sequence or (2) carrying out a plurality of the successive actions beginning with the first action in the determined action sequence.

3. The method of claim 1, further comprising:

providing a user interface when regulating, controlling, or both regulating and controlling the technical system, wherein the user interface is configured to be used by a user to change the measure of quality.

4. The method of claim 1, wherein the simulation model is one or more of a data-driven model, an analytical model, or a physical model of the technical system, wherein, when the simulation model includes the data-driven model, the data-driven model comprises a neural network, the neural network being trained on the basis of training data from known action sequences having known resulting states of the technical system.

5. The method of claim 4, wherein the simulation model includes the data-driven model, wherein the data-driven model is based on one or more of Gaussian processes, regression trees, or support vector regression.

6. The method of claim 4, wherein the neural network is a recurrent neural network.

7. The method of claim 1, wherein the numerical optimization method further comprises a non-convex heuristic optimization method, a gradient-free stochastic search method, or both the non-convex heuristic optimization method and the gradient-free stochastic search method.

8. The method of claim 1, wherein the numerical optimization method further comprises an evolutionary algorithm, a genetic algorithm, a simulated annealing, or any combination thereof.

9. The method of claim 1, wherein the measure of quality is a sum, the summands of which each comprise an assessment measure determined for each state resulting from an action in the action sequence.

10. The method of claim 9, wherein the assessment measure in the respective summand is multiplied by a factor that is smaller, the closer the state, for which the assessment measure is determined, is to the end of the action sequence.

11. The method of claim 1, wherein the electrical energy generation installation comprises a gas turbine that is regulated, controlled, or both regulated and controlled.

12. The method of claim 11, wherein a state of the gas turbine comprises one or more of the following state variables:

a compressor efficiency of the gas turbine;

a turbine efficiency of the gas turbine;

a regulated exhaust gas temperature of the gas turbine;

a position of one or more guide blades;

a position of one or more guide blades of a compressor of the gas turbine;

a rotational speed of the gas turbine;

one or more pressures, temperatures, or pressures and temperatures in the gas turbine;

one or more of an inlet temperature, an inlet pressure, an outlet temperature, or an outlet pressure of the compressor;

one or more of an inlet temperature, an inlet pressure, an outlet temperature, or an outlet pressure of the gas turbine;

a temperature in an environment in which the gas turbine is operated;

a humidity in the environment in which the gas turbine is operated;

a air pressure in the environment in which the gas turbine is operated;

one or more mass flows, volumetric flows, or mass and volumetric flows;

one or more parameters of a cooling system, auxiliary system, lubricating oil system, or bearing system in the gas turbine;

a position of one or more valves for supplying cooling air;

a performance of the gas turbine;

a percentage performance value of the gas turbine;

a fuel quality of the gas turbine;

a pollutant emission of the gas turbine;

an emission of nitrogen oxides, carbon monoxide, or both nitrogen oxides and carbon monoxide in the gas turbine;

a temperature of one or more turbine blades of the gas turbine;

a combustion dynamics of a combustion chamber of the gas turbine;

one or more parameters relating to a supply of gas to the combustion chamber of the gas turbine;

an amount of gas supplied to the gas turbine; or bearing vibrations, housing vibrations, or both bearing and housing vibrations in the gas turbine.

13. The method of claim 12, wherein the optimization criterion for operating the technical system comprises a lowest possible pollutant emission of the gas turbine, a lowest possible dynamics of the combustion chamber of the gas turbine, or both the lowest possible pollutant emission and the lowest possible dynamics of the combustion chamber of the gas turbine.

14. An apparatus for controlling and/or regulating a technical system in a computer-assisted manner, the apparatus comprising a computer configured to:
provide a simulation model of a technical system for predicting resulting states of the technical system for respective action sequences;
determine an action sequence having a highest possible measure of quality at a respective predefined time from a sequence of successive predefined times using a numerical optimization method, the numerical optimization method using the simulation model to predict the resulting states for action sequences generated during the numerical optimization method and to then determine the measure of quality of the generated action sequences using the predicted states; and
carry out one or more actions in the determined action sequence on the technical system, such that one or more state variables of the technical system are changed; and
operate the technical system based on the one or more changed state variables of the technical system,
wherein the numerical optimization method comprises a particle swarm optimization, the particles of which are assigned to respective action sequences randomly determined when initializing the particle swarm optimization and are iteratively changed during the particle swarm optimization by respective speed vectors, the respective speed vectors being determined using a fitness function corresponding to the measure of quality, and
wherein the technical system is an electrical energy generation installation.

15. A non-transitory computer program product having a program code stored on a machine-readable carrier, wherein the computer code is configured to, when executed on a computer, at least perform:
provide a simulation model of a technical system for predicting resulting states of the technical system for respective action sequences;
determine an action sequence having a highest possible measure of quality at a respective predefined time from a sequence of successive predefined times using a numerical optimization method, the numerical optimization method using the simulation model to predict the resulting states for action sequences generated during the numerical optimization method and to then determine the measure of quality of the generated action sequences using the predicted states; and
carry out one or more actions in the determined action sequence on the technical system, such that one or more state variables of the technical system are changed; and
operate the technical system based on the one or more changed state variables of the technical system,
wherein the numerical optimization method comprises a particle swarm optimization, the particles of which are assigned to respective action sequences randomly determined when initializing the particle swarm optimization and are iteratively changed during the particle swarm optimization by respective speed vectors, the respective speed vectors being determined using a fitness function corresponding to the measure of quality, and
wherein the technical system is an electrical energy generation installation.

* * * * *